(12) United States Patent
Searby

(10) Patent No.: US 10,353,442 B2
(45) Date of Patent: Jul. 16, 2019

(54) EXPANSION SLOT INTERFACE

(71) Applicant: Hewlett-Packard Development Company, L.P., Houston, TX (US)

(72) Inventor: Tom J. Searby, Eaton, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/543,205

(22) PCT Filed: Jan. 30, 2015

(86) PCT No.: PCT/US2015/013646
§ 371 (c)(1),
(2) Date: Jul. 12, 2017

(87) PCT Pub. No.: WO2016/122555
PCT Pub. Date: Aug. 4, 2016

(65) Prior Publication Data
US 2017/0371382 A1 Dec. 28, 2017

(51) Int. Cl.
*G06F 1/18* (2006.01)
*G06F 13/40* (2006.01)
*G06F 13/42* (2006.01)

(52) U.S. Cl.
CPC .......... *G06F 1/185* (2013.01); *G06F 13/4068* (2013.01); *G06F 13/4282* (2013.01); *G06F 2213/0026* (2013.01)

(58) Field of Classification Search
None
See application file for complete search history.

(56) References Cited

U.S. PATENT DOCUMENTS

| 6,533,587 | B1 | 3/2003 | Potter et al. |
| 6,572,384 | B1 * | 6/2003 | Marchevsky ......... G06F 13/409 439/43 |
| 7,254,038 | B2 * | 8/2007 | Drako ................. G06F 1/185 361/752 |

(Continued)

FOREIGN PATENT DOCUMENTS

| CN | 100351734 C | 11/2007 |
| CN | 204028898 U | 12/2014 |

(Continued)

OTHER PUBLICATIONS

'SFF-8639 Specification for Multifunction 6X Unshielded Connector' Rev 2.0, Jan. 15, 2015, SFF Committee.*

(Continued)

*Primary Examiner* — Steven G Snyder
(74) *Attorney, Agent, or Firm* — Brooks, Cameron & Huebsch PLLC

(57) ABSTRACT

An expansion slot interface may include a low-profile interface card to engage with an expansion slot, a linking device fixed to the interface card, and an expansion component connector to operably engage with an expansion component. The expansion component may be disposed apart from the interface card. The low-profile interface card may fit underneath a doublewide expansion component that is engaged with an adjacently disposed expansion slot, and the linking device may operably engage the interface card with the expansion component connector.

12 Claims, 2 Drawing Sheets

(56) References Cited

U.S. PATENT DOCUMENTS

| | | | | |
|---|---|---|---|---|
| 8,331,095 B2* | 12/2012 | Hu | ............... | H05K 7/1487 |
| | | | | 312/223.1 |
| 8,611,097 B2* | 12/2013 | Yin | ............... | G06F 1/189 |
| | | | | 361/679.31 |
| 8,625,303 B2* | 1/2014 | Yin | ............... | G06F 1/185 |
| | | | | 361/679.31 |
| 8,743,552 B2* | 6/2014 | Tian | ............... | G06F 3/0658 |
| | | | | 361/679.31 |
| 9,575,519 B2* | 2/2017 | Yin | ............... | G06F 1/185 |
| 2006/0238991 A1 | 10/2006 | Drako | | |
| 2008/0268673 A1 | 10/2008 | Le et al. | | |
| 2010/0049893 A1 | 2/2010 | Drako | | |
| 2011/0086520 A1 | 4/2011 | Mills et al. | | |
| 2011/0194242 A1* | 8/2011 | Hu | ............... | G06F 1/187 |
| | | | | 361/679.32 |
| 2012/0033370 A1 | 2/2012 | Reinke et al. | | |
| 2013/0038999 A1* | 2/2013 | Tian | ............... | G06F 3/0658 |
| | | | | 361/679.41 |
| 2013/0151745 A1* | 6/2013 | Yin | ............... | G06F 1/189 |
| | | | | 710/301 |
| 2013/0155637 A1* | 6/2013 | Yin | ............... | G06F 1/185 |
| | | | | 361/791 |
| 2013/0163175 A1 | 6/2013 | Kim et al. | | |
| 2014/0365704 A1* | 12/2014 | Yousuf | ............... | G06F 13/28 |
| | | | | 710/308 |
| 2015/0062797 A1* | 3/2015 | Yin | ............... | G06F 1/185 |
| | | | | 361/679.32 |
| 2015/0092788 A1* | 4/2015 | Kennedy | ............... | G06F 1/185 |
| | | | | 370/419 |
| 2015/0347345 A1* | 12/2015 | Hellriegel | ............... | G06F 13/409 |
| | | | | 710/301 |
| 2016/0043484 A1* | 2/2016 | Brodsky | ............... | H01R 12/716 |
| | | | | 439/65 |
| 2017/0315956 A1* | 11/2017 | Choi | ............... | G06F 1/266 |

FOREIGN PATENT DOCUMENTS

| | | |
|---|---|---|
| TW | M457317 | 7/2013 |
| TW | M472234 | 2/2014 |
| WO | WO-2013/013699 A1 | 1/2013 |

OTHER PUBLICATIONS

Paul Alcom, Samsung XS1715 1.6TB 2.5-inch NVMe PCIe Enterprise SSD Review—SFF-8639 and ExpressBay, Posted Oct. 23, 2014 2:30pm, Retrieved Jan. 14, 2015, 6 Pages.

PCI-e 8X Slot Riser Card Extender Extension Cable Flexible Cable, AGPtek, 2015, pp. 1-2, Newegg Inc., Available at: <http://www newegg com/Product/Product aspxItem=9SIA0U01H79622>.

Tom Heil, "The Evolution of Solid-state Storage in Enterprise Servers," Apr. 23, 2013, pp. 1-8, Electronic Design.

* cited by examiner

EXPANSION SLOT INTERFACE

BACKGROUND

Computer systems can have main system boards, sometimes called motherboards, mainboards, or system boards. System boards can include computer system components, including expansion connectors, sometimes referred to as expansion slots. Computer expansion slots can interface and engage with various expansion components that a user may want to connect to the computer system in order to enhance the performance or capabilities of the computer system. Expansion components may include, but are not limited to, storage devices or storage device arrays, network cards, audio cards, or high powered graphics cards.

Computer expansion slots are often disposed adjacent to each other in the same area of the system board. This can allow the expansion components engaged with such slots to have all of their input/output (I/O) panels aligned near each other on the exterior of the computer system housing or case.

DETAILED DESCRIPTION

Figure 1:
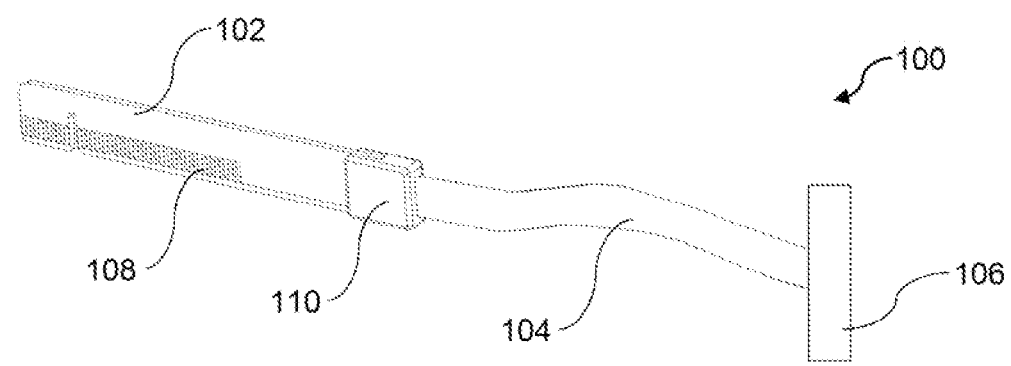
FIG. 1 is a perspective view of an example expansion slot interface including an interface card, a linking device, and an expansion component connector.

Computer systems can interface with expansion components to enhance the capability and performance of the computer system. Such expansion components may include storage devices for storing data and transferring data to and from the computer system. Storage devices may include magnetic hard disk drives, or solid state drives or flash memory. Expansion components may also include, but are not limited to, network cards for network and internet connectivity, audio cards, and high-powered graphics cards for advanced graphical computation and output on a display device of the computer system.

Computer systems can interface with such expansion components through the use of expansion connectors or expansion slots, disposed on the system board or motherboard of the computer system. Expansion components can have edge connectors with multiple contacts or pins (e.g., a gold finger connector). The edge connector can include signal, power, and ground contacts. The edge connector can be inserted into the expansion slot on the system board where the multiple contacts can engage with complementary receptacle contacts such that the expansion component is operably engaged with the computer system. Expansion components may be mechanically fixed to the expansion slot, the system board, or to the system enclosure or chassis with fasteners or latches while the expansion component's edge connector is engaged with the expansion slot. This can prevent the accidental disengagement of the expansion component from the expansion slot.

An expansion slot can use an expansion bus of the computer system to connect an expansion component to the main system bus of the computer system for the transfer of data. Expansion slots may include Peripheral Component Interconnect (PCI) slots. Accelerated Graphics Port (AGP) slots. Peripheral Component Interconnect Express (PCIe) slots, or other computer bus standard slots.

In some situations, an expansion component may not have an edge connector that is mechanically compatible with an expansion slot of the computer system. Additionally, some expansion components may not have an edge connector at all. In these situations, such expansion components may engage with an expansion slot through the use of an intermediate adapter add-in card when direct engagement of the expansion component with the expansion slot is impractical or impossible. This may include expansion components that need to be externally accessible or located remotely from the internal system board and the expansion slots thereon. Externally accessible expansion components may need to employ an intermediate adapter add-in card due to the mechanical fastening features of the expansion slots, as mentioned above, or the configuration of the system board and the computer system's case or housing, making direct engagement impractical. Adapter add-in cards may be used when the expansion component is an external or externally accessible storage device or array of multiple storage devices. The storage devices may be connected to the intermediate adapter add-in card through the use of one or multiple cables, and the adapter add-in card may have an edge connector with multiple contacts to engage with the expansion slot. The one or multiple cables may engage with the intermediate adapter add-in card and the expansion component through the use of removable, electrically conductive connectors.

Utilizing an intermediate adapter add-in card to engage an expansion component such as a storage device with an expansion slot of a computer system increases the complexity of the computer system and can decrease signal quality and performance of the expansion component by increasing the number of interconnects between the expansion component and the expansion slot's bus controller.

Implementations of the present disclosure provide an expansion slot interface that can engage an expansion component directly with an expansion slot, without the need for an intermediate adapter add-in card. The expansion slot interface can engage with an external expansion component, an expansion component that is externally accessible from the computer system, or an expansion component mounted within the computer system. The expansion slot interface can also engage an expansion component with an expansion slot when it is otherwise impractical, difficult, or incompatible to directly engage the edge connector or another connector of the expansion component with the expansion slot. Without the need for an intermediate adapter add-in card, the expansion slot interface can minimize the number of interconnections between the expansion component and the expansion slot bus controller, and can thereby increase signal quality and performance of the expansion component.

Additionally, multiple expansion slots can be disposed adjacent to each other on the system board of the computer system. When an expansion component is engaged with one of the expansion slots, the component may overhang one or more adjacently-disposed expansion slots, due to the size and number of the components included on the expansion component. The expansion component may prevent the use of the adjacent slots that the expansion component hangs over. In some situations, the overhanging expansion component is a doublewide or triplewide expansion component. A doublewide expansion component may overhang one adjacently-disposed expansion slot thereby preventing the engagement of another expansion component with that slot. Similarly, a triplewide expansion component may overhang two adjacently-disposed expansion slots, preventing either of their use by another expansion component. In further situations, the overhanging expansion component may be a high-powered graphics card that includes bulky thermal and acoustic components that cause the graphics card to overhang one or more adjacently-disposed expansion slots.

Implementations of the present disclosure provide an expansion slot interface that is low-profile and can be engaged with otherwise unusable expansion slots over which a doublewide or triplewide expansion component overhangs. The expansion slot interface can, therefore, increase the capabilities and performance of computer systems that employ such a doublewide or triplewide expansion component by enabling an expansion component to be engaged with an expansion slot that is covered by the overhanging expansion component.

Referring now to FIG. 1, a perspective view of an example expansion slot interface is illustrated. The expansion slot interface 100 may include an interface card 102, a linking device 104, and an expansion component connector 106. The interface card 102 may include an edge connector 108. The interface card 102 may further structurally support and electrically connect one or more electronic components. The interface card 102 may, in some implementations, connect one or more electronic components with conductive pathways, which, in further implementations, may include copper. In yet further implementations, the interface card 102 may be made, at least partially, out of a non-conductive substrate with copper pathways etched onto the substrate. In some implementations, the non-conductive substrate may include silicone. In further implementations, the interface card 102 might comprise a single-layer printed circuit board (PCB), or a multi-layer PCB in other implementations.

The edge connector 108 may include multiple contacts, including signal, power, and ground contacts. The multiple contacts may be to engage with complementary receptacle contacts in a computer system's expansion slot such that the interface card 102 is operably engaged with such an expansion slot and, thus, signal circuits, power circuits, and ground circuits of the computer system. The edge connector 108 may engage with the expansion slot by being inserted into the slot from a direction parallel to the slot opening, and perpendicular to the system board. In some implementations, the expansion slot may be disposed on the system board of the computer system. In further implementations, the multiple contacts of the edge connector 108 may be able to support multiple signal paths from the interface card 102 to the computer system's expansion slot, and, thus, the expansion bus and main system bus of the computer system. In yet further implementations, the expansion slot is a PCIe expansion slot, the edge connector 108 being operably engageable with the PCIe expansion slot.

The linking device 104 may operably engage the interface card 102 with the expansion component connector 106 for the transfer of electrical signals from the expansion component connector 106 to the interface card 102. In some implementations, the linking device 104 may electrically connect the interface card 102 with the expansion component connector 106 with conductive wire. In further implementations, the linking device 104 may comprise a cable including a plurality of conductive wires which may each include copper. In some implementations, the linking device 104 may be able to support multiple signal paths from the expansion component connector 106 to the interface card 102. The linking device 104 may be fixed to the interface card 102 through an attachment portion 110. The linking device 104 may extend away from the interface card 102 or the edge connector 108 laterally from the direction of engagement of the edge connector 108 and the expansion slot. The attachment portion 110 may directly connect the linking device 104 to the multiple contacts of the edge connector 108 such that a signal coming from the expansion component connector 106 will be directly passed through the linking device 104 and the interface card 102 to the multiple contacts of the edge connector 108 without passing through any further connectors or electrical components. In other words, the interface card 102 may be a pass-through card for directly connecting the expansion component connector 106 to the expansion slot. This may be accomplished by having each conductive wire in the linking device 104 directly connected to electrical pathways on the interface card 102 that, in turn, connect directly to each of the multiple contacts of the edge connector 108, such that there are no removable connection points between the linking device 104 and the multiple contacts of the edge connector 108. In some implementations, each conductive wire in the linking device 104 may be directly soldered to the electrical pathways on the interface card 102 at the attachment portion 110. In further implementations, the linking device 104 may be fixed directly to the edge connector 108, having each conductive wire directly soldered to the multiple contacts of the edge connector 108.

The linking device 104 may be routed internally or externally from the computer system that the expansion slot interface 100 is engaged with. The linking device 104, therefore, allows the expansion slot interface 100 to engage an expansion slot disposed on the system board of a computer system with an externally-disposed expansion component that other wise would not be engageable with the computer system without the use of an intermediate adapter add-in card.

The expansion component connector 106 may be an electrical connector that can operably engage the linking device 104 with an expansion component. The expansion component connector 106 may have multiple contacts to engage with complementary contacts on the expansion component, the multiple contacts electrically connected to the linking device 104, and the interface card 102 through the linking device 104. In some implementations, the multiple contacts of the expansion component connector 106 may support multiple signal paths from the expansion component. In some implementations, the expansion component connector 106 may be an electrical connector that is to be engaged with an electrical backplane, or, in further implementations, a PCIe-compatible backplane. In some implementations, the expansion component connector 106 may be compatible with Small Computer System Interface (SCSI), Serial Attached SCSI (SAS), Serial AT Attachment (SATA), SATA Express, PCI, PCIe, or other data transfer standard connectors. In further implementations, the expansion component connector 106 may be a multifunction SFF-8639 connector.

The expansion component connector 106 may operably engage with at least one expansion component, and, thus, operably engage the at least one expansion component with a computer system through the linking device 104 and the interface card 102. In some implementations, the expansion component may be disposed apart from the interface card 102 or the edge connector 108. In further implementations, the expansion component may be disposed externally from the expansion slot that the interface card 102 is engaged with. The expansion slot interface 100 may include multiple expansion component connectors 106 engaged with the linking device 104 such that the expansion slot interface 100 can engage multiple expansion components with the computer system. In some implementations, the expansion component connector 106 may operably engage with a PCB backplane with multiple expansion components engaged therewith. In further implementations, the at least one expansion component engaged with the expansion component connector 106 may be a PCIe expansion component, or, further, may be a PCIe-compatible storage device or an array of PCIe-compatible storage devices.

Figure 2:
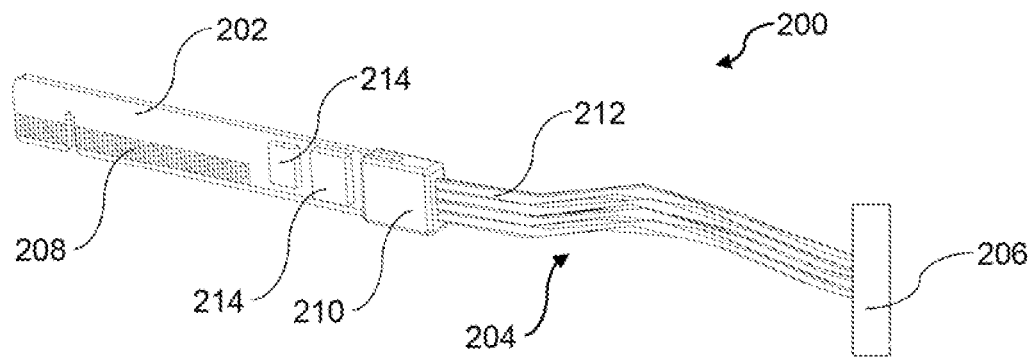
FIG. 2 is a perspective view of an example expansion slot interface.

Referring now to FIG. 2, a perspective view of an example expansion slot interface is illustrated. Expansion slot interface 200 may be similar to expansion slot interface 100. Further, the similarly named elements of expansion slot interface 200 may be similar in function to the elements of expansion slot interface 100, as they are described above. The expansion slot interface 200 may include active electrical components 214 disposed on the interface card 202. Active electrical components 214 may be electrical components that are capable of supplying energy or conditioning to the signal going to or coming from an expansion component engaged with the expansion component connector 206. The active electrical components 214 may include components to amplify or clarify the signal coming from or going to the expansion component. Further, the active electrical components 214 may include redrivers, repeaters, signal conditioners, voltage regulation, or other integrated circuits.

The expansion slot interface 200 may further include a linking device 204, as it is described above. The linking device 204 may include multiple conductive wires to operably engage the expansion component connector with the interface card 202. Further, the linking device 204 may include one or more cables 212, each cable 212 including at least one conductive wire. In some implementations, an attachment portion 210 may electrically engage the linking device 204 with the interface card 202 through a removable connector such as a plug and receptacle connector. In other implementations, the attachment portion 210 may include the individual conductive wires within each cable 212 directly soldered to the electrical pathways of the interface card, and, thus, to multiple contacts of an edge connector 208 of the interface card 202. In some implementations, the edge connector 208 may be engageable with a PCIe expansion slot.

Figure 3:
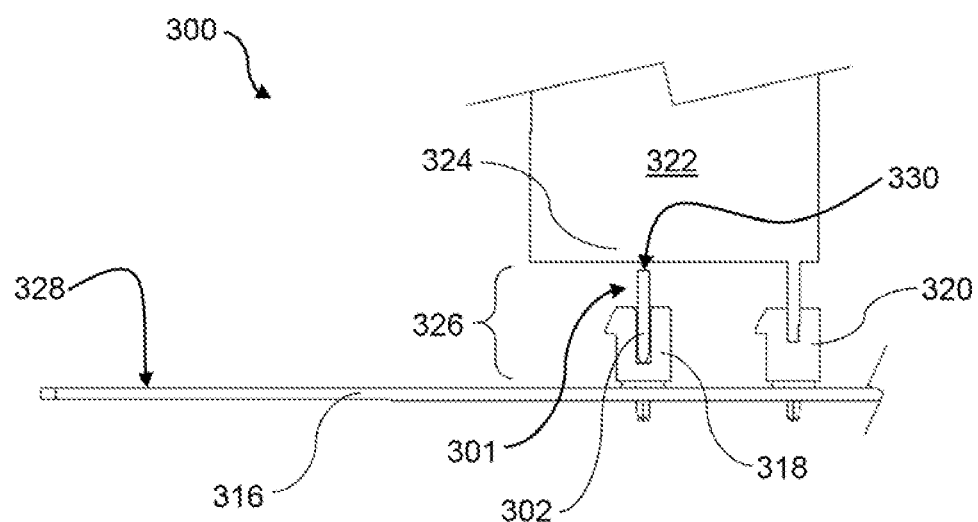
FIG. 3 is a front view of a computer board assembly including an example expansion slot interface.

Referring now to FIG. 3, a front view of a computer board assembly 300 including an example expansion slot interface 301 is illustrated. The computer board assembly 300 may include a system board 316, a first expansion slot 318, and an expansion slot interface 301 having a low-profile interface card 302. The low-profile interface card 302 may be similar in function to the similarly named elements above. The computer board assembly 300 may further include a second expansion slot 320, and a doublewide expansion component 322 operably engaged with the second expansion slot 320.

The system board 316 may structurally support and electrically connect multiple electronic components. The system board 316 may, in some implementations, connect multiple electronic components with conductive pathways, which, in further implementations, may include copper. In yet further implementations, the system board 316 may be made at least partially out of a non-conductive substrate with copper pathways etched onto the substrate. In some implementations, the non-conductive substrate may include silicone. In further implementations, the system board 316 might comprise a single-layer printed circuit board (PCB), or a multi-layer PCB in other implementations. The system board 316, further, may be a printed circuit assembly (PCA) including one or more of expansion slots, processors, Random Access Memory (RAM), optical, magnetic, or solid state storage devices, heat sinks, cooling fans, and other traditional computer and electrical components. The system board 316 may further include a main system bus, as well as an expansion bus for the transfer of data. In some implementations, the system board and the configuration of the components thereon may comply with Advanced Technology eXtended (ATX), Micro ATX, Embedded Platform Integrated Architecture (EPIA), Balanced Technology eXtended (BTX), or other computer system board size and configuration standards.

The system board 316 may include a first and second expansion slot, 318 and 320, respectively, disposed on the system board 316. The first and second expansion slots, 318 and 320, may be electrical connectors, each having multiple receptacle contacts, including signal, power, and ground contacts. The signal, power, and ground contacts may be connected to signal circuits, power circuits, and ground circuits, respectively, of the computer board assembly. The first and second expansion slots, 318 and 320, may each be to engage with an edge connector, the edge connector having multiple complementary contacts to engage with the multiple receptacle contacts of the expansion slots. Each of the first and second expansion slots, 318 and 320, may be electrically engaged with the expansion bus disposed on the computer board assembly 300, the expansion bus to enable data transfer between an expansion component engaged with either of the first or second expansion slots, 318 and 320, and the main system bus disposed on the computer board assembly 300. In some implementations, the first and second expansion slots, 318 and 320, respectively, may each be two-way serial connectors. In further implementations, either or both of the first and second expansion slots, 318 and 320, may be a PCIe expansion slot.

The first and second expansion slots, 318 and 320, may be disposed adjacent to each other and parallel to each other. The first and second expansion slots, 318 and 320, may be disposed adjacently such that a doublewide expansion component 322 engaged with the second expansion slot 320 overhangs the first expansion slot 318, defining an overhanging portion 324 of the doublewide expansion component 322, and defining a maximum low-profile interface card height envelope 326. The maximum low-profile interface card height envelope 326 may be the height from the system board top surface 328 to the interface card top edge 330. The doublewide expansion component 322 may be an expansion component that exceeds power, thermal, and geometric size limits of a traditional, single-slot sized expansion component, and, thus, requires more component volume for thermal and acoustic management. In further implementations, the doublewide expansion component 322 may be a doublewide graphics expansion component that interfaces with a PCIe expansion slot.

The computer board assembly 300 may further include an expansion slot interface 301 engaged with the first expansion slot 318. Expansion slot interface 301 may be similar to expansion slot interface 100. Further, the similarly named elements of expansion slot interface 301 may be similar in function to the elements of expansion slot interface 100, as they are described above. The expansion slot interface 301 may include a low-profile interface card 302 to engage with an expansion slot such as the first expansion slot 318. The low-profile interface card 302 may engage with an expansion slot by being inserted into such an expansion slot. In some implementations, the expansion slot interface 301 may engage with an expansion slot by having an edge connector of the interface card 302 inserted into the expansion slot. The expansion slot interface 301 may be operably engaged with the first expansion slot 318 while the doublewide expansion component 322 is operably engaged with the second expansion slot 320 such that the doublewide expansion component 322 overhangs the first expansion slot 318 and the low-profile interface card 302 of the expansion slot interface 301. The low-profile interface card 302 may have a maximum card height such that the low-profile interface card 302 will always fit within the maximum low-profile interface card height envelope 326. In other words, the low-profile interface card 302 may always fit between the overhanging portion 324 of an adjacently-disposed doublewide expansion component 322 and the expansion slot with which the low-profile interface card 302 is engaged. In further implementations, the maximum low-profile interface card height envelope 326 may comply with PCIe standards.

The computer board assembly 300 may include a triplewide expansion component, in further implementations. Similar to the doublewide expansion component 322, the triplewide expansion component may be an expansion component that exceeds power, thermal, and geometric size limits of a traditional, single-slot sized expansion component. As such, a triplewide expansion component requires more component volume for thermal and acoustic management, and, thus, may overhang two adjacent expansion slots. In some implementations, the triplewide expansion component may be an expansion component that interfaces with a PCIe expansion slot.

The computer board assembly 300, if including a triplewide expansion component, may also include two expansion slots that are adjacent to the expansion slot engaging the triplewide expansion component. The triplewide expansion component may overhang both of these adjacent expansion slots. An example expansion slot interface 301 having a low-profile interface card 302, may, similar to FIG. 3 and as described above, engage with either or both of the overhung expansion slots adjacent to the triplewide expansion component.

What is claimed is:
1. A computer board assembly, comprising:
a system board;
a first expansion slot disposed on the system board;
a second expansion slot disposed adjacently to the first expansion slot on the system board;
a expansion card engaged with the second expansion slot and at least partially overhanging the first expansion slot, wherein the expansion card is a doublewide expansion card, a triple wide expansion card, or a quadruple wide expansion card; and
an expansion slot interface, including:
a low-profile interface card directly connected to the first expansion slot; and
a linking device connecting the low-profile interface card to an expansion component connector,
wherein the low-profile interface card is disposed in between the overhanging portion of the expansion card and the first expansion slot when the expansion card is engaged with the second expansion slot.

2. The computer board assembly of claim 1, wherein the first and second expansion slots are Peripheral Component Interconnect Express (PCIe) slots.

3. The computer board assembly of claim 1, wherein the expansion component connector is engaged with an expansion component that is disposed apart from the interface card.

4. The computer board assembly of claim 1, wherein the linking device is a cable, the cable including a plurality of wires to operably engage the interface card with the expansion component connector.

5. The computer board assembly of claim 4, wherein the low-profile interface card is a printed circuit board (PCB) with an edge connector to operably connect with the first expansion slot.

6. The computer board assembly of claim 5, wherein the plurality of wires are soldered directly to the PCB.

7. The computer board assembly of claim 5, wherein the edge connector is to operably engage with a Peripheral Component Interconnect Express (PCIe) slot.

8. The computer board assembly of claim 1, wherein the interface card is a pass-through card.

9. The computer board assembly of claim 1, wherein the expansion component connector is a multifunction SFF-8639 connector.

10. The computer board assembly of claim 1, wherein the low-profile interface card is a printed circuit board (PCB) with an edge connector to operably connect with the first expansion slot.

11. The computer board assembly of claim 1, wherein the expansion component connector is a PCIe-compatible connector.

12. The computer board assembly of claim 11, wherein the expansion component is a PCIe-compatible storage device.

* * * * *